United States Patent [19]

Isshiki et al.

[11] 4,180,800
[45] Dec. 25, 1979

[54] CHARACTER READING SYSTEM

[75] Inventors: Isao Isshiki; Akihiro Ohoka; Koji Sato, all of Osaka, Japan

[73] Assignee: Sumitomo Electric Industries, Ltd., Osaka, Japan

[21] Appl. No.: 922,415

[22] Filed: Jul. 6, 1978

[30] Foreign Application Priority Data

Jul. 7, 1977 [JP] Japan .................................. 52-81179
Jul. 7, 1977 [JP] Japan .................................. 52-81180
Jul. 7, 1977 [JP] Japan .................................. 52-81181

[51] Int. Cl.² ........................................... G06K 9/12
[52] U.S. Cl. ................... 340/146.3 SY; 340/146.3 H; 340/146.3 M A
[58] Field of Search ........... 340/146.3 SY, 146.3 MA, 340/146.3 AC, 146.3 AE, 146.3 J, 146.3 H

[56] References Cited

U.S. PATENT DOCUMENTS

| | | | |
|---|---|---|---|
| 3,639,902 | 2/1972 | Dietrich | 340/146.3 AC |
| 3,873,972 | 3/1975 | Levine | 340/146.3 AC |
| 3,964,022 | 6/1976 | Martin | 340/146.3 SY |
| 4,061,998 | 12/1977 | Ito | 340/146.3 AC |
| 4,063,219 | 12/1977 | Dishaw et al. | 340/146.3 MA |

*Primary Examiner*—Leo H. Boudreau
*Attorney, Agent, or Firm*—Sughrue, Rothwell, Mion, Zinn and Macpeak

[57] ABSTRACT

An optical character reading system first determines the height and width of the character to determine its authenticity and then examines the features of each line and/or column and classifies each line or column according to its pattern. The sequence in which the classification numbers occurs is indicative of the character detected. Correction of oblique scanning and direction determining features are also included.

12 Claims, 40 Drawing Figures

FIG. 1 PRIOR ART
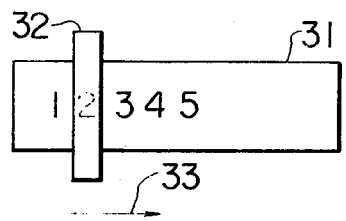
FIG. 2(a) PRIOR ART
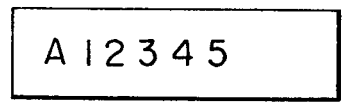
FIG. 2(b) PRIOR ART
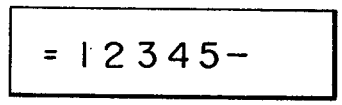
FIG. 3
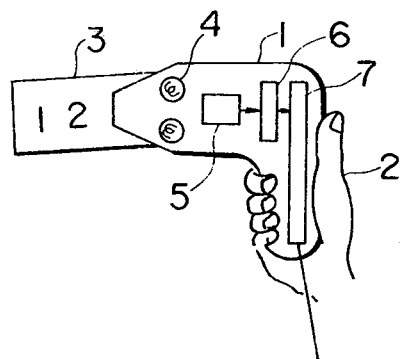
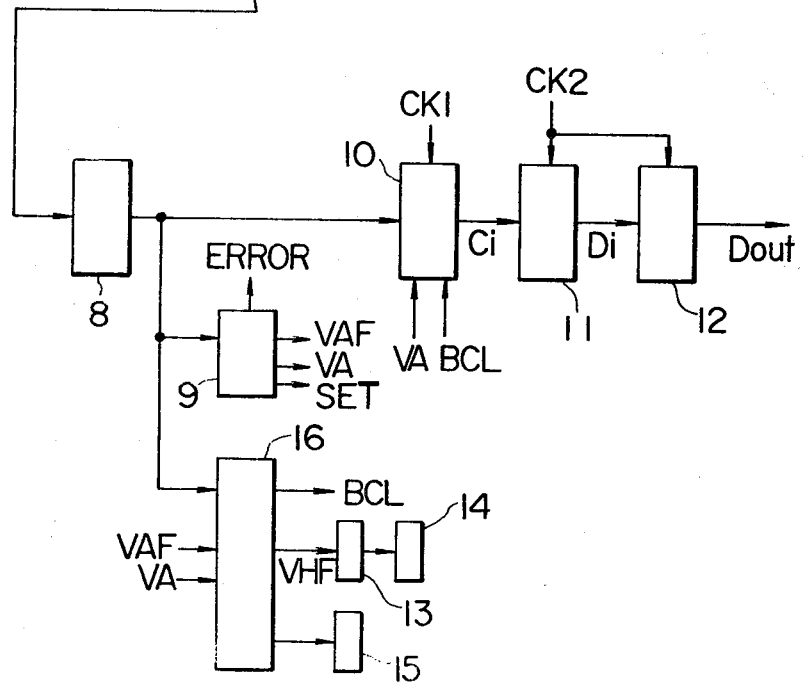

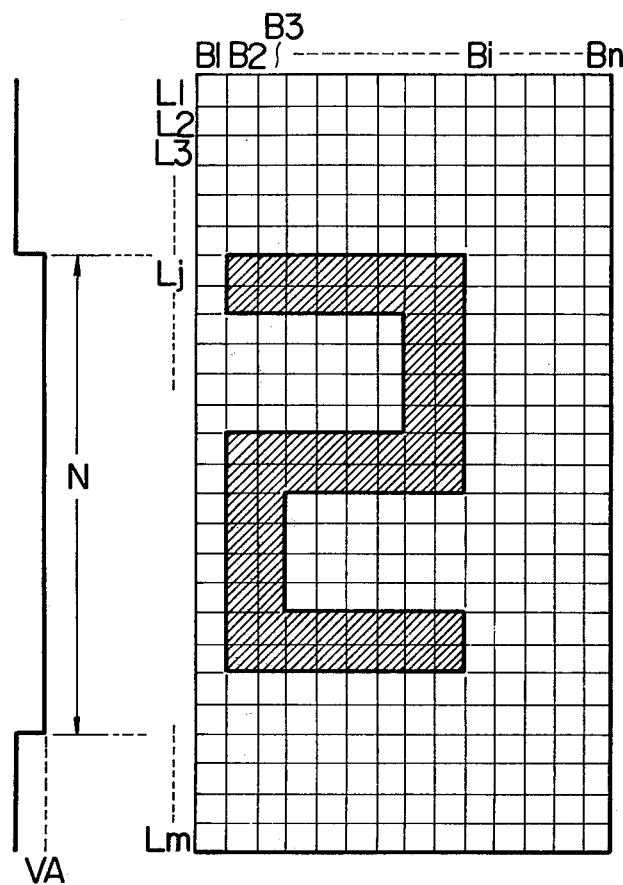
FIG. 4
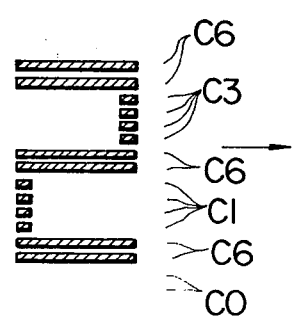 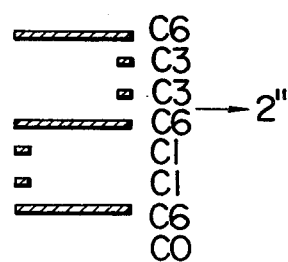
FIG. 7(a)   FIG. 7(b)   FIG. 7(c)

FIG. 6

| CLASSI-FICATION | LINE SEGMENT | SIGNIFICANCE OF LINE SEGMENT |
|---|---|---|
| C0 | | NO LINE SEGMENT |
| C1 | ▓ | A VERTICAL LINE SEGMENT AT LEFT SIDE OF A CHARACTER |
| C2 | ▓ | A VERTICAL LINE SEGMENT AT CENTRAL PORTION OF A CHARACTER |
| C3 | ▓ | A VERTICAL LINE SEGMENT AT RIGHT SIDE OF A CHARACTER |
| C4 | ▓  ▓ | TWO VERTICAL LINE SEGMENTS AT OPPOSITE SIDES OF A CHARACTER |
| C5 | ▓ ▓ | TWO VERTICAL LINE SEGMENTS SUBSTANTIALLY INSIDE OF A CHARACTER |
| C6 | ▭ | A HORIZONTAL LINE SEGMENT AT LEFT SIDE OF A CHARACTER |
| C7 | ▭ | A HORIZONTAL LINE SEGMENT AT RIGHT SIDE OF A CHARACTER |

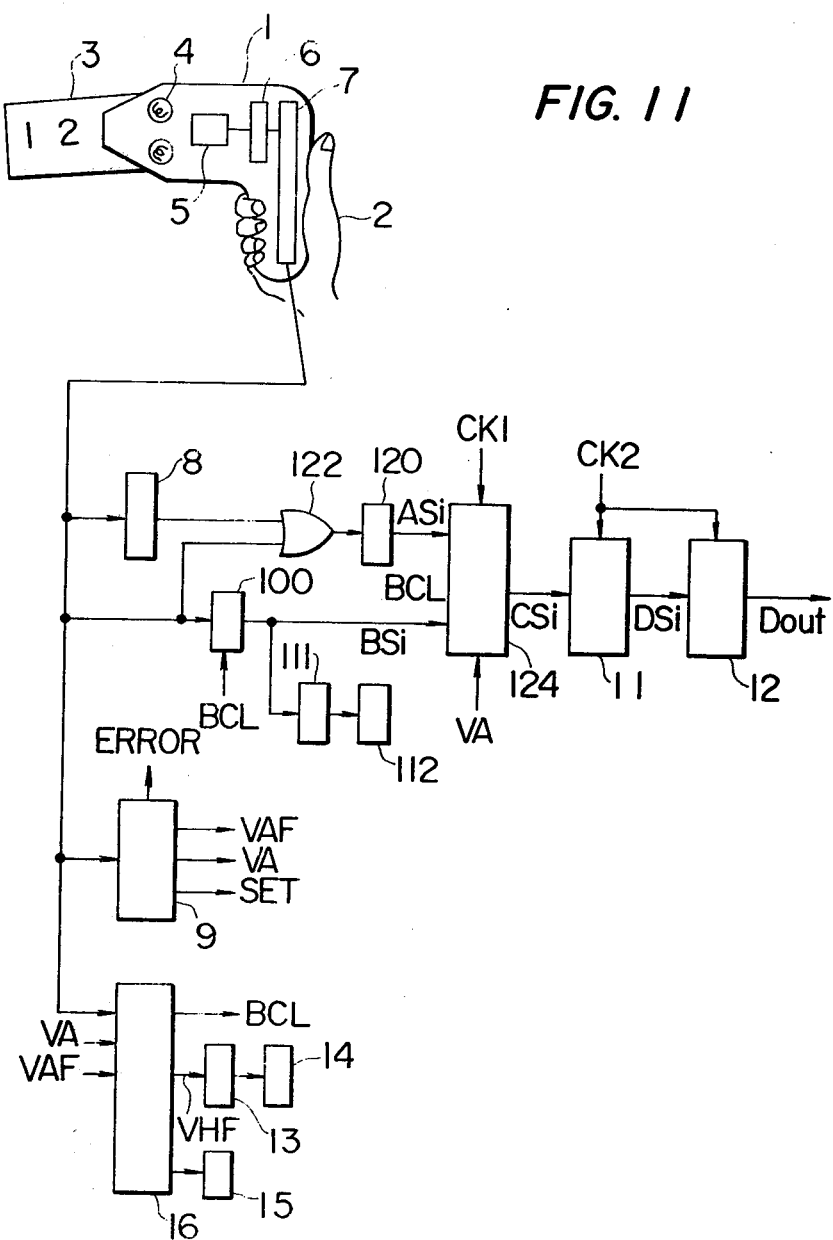

FIG. 14

| CLASSI-FICATION | LINE SEGMENT | SIGNIFICANCE OF LINE SEGMENT |
|---|---|---|
| C0 | | NO LINE SEGMENT |
| C1 | ▮ | A VERTICAL LINE SEGMENT AT LEFT SIDE OF A CHARACTER |
| C2 | ▮ | A VERTICAL LINE SEGMENT AT CENTRAL PORTION OF A CHARACTER |
| C3 | ▮ | A VERTICAL LINE SEGMENT AT RIGHT SIDE OF A CHARACTER |
| C4 | ▮  ▮ | TWO VERTICAL LINE SEGMENTS |
| C5 | ▬ (▬) | A PORTION OF A HORIZONTAL LINE SEGMENT EXISTING AT LEFT SIDE OF A CHARACTER |
| C6 | (▬) ▬ | A PORTION OF A HORIZONTAL LINE SEGMENT EXISTING AT RIGHT SIDE OF A CHARACTER |
| C7 | ▬▬▬ | A HORIZONTAL LINE SEGMENT |

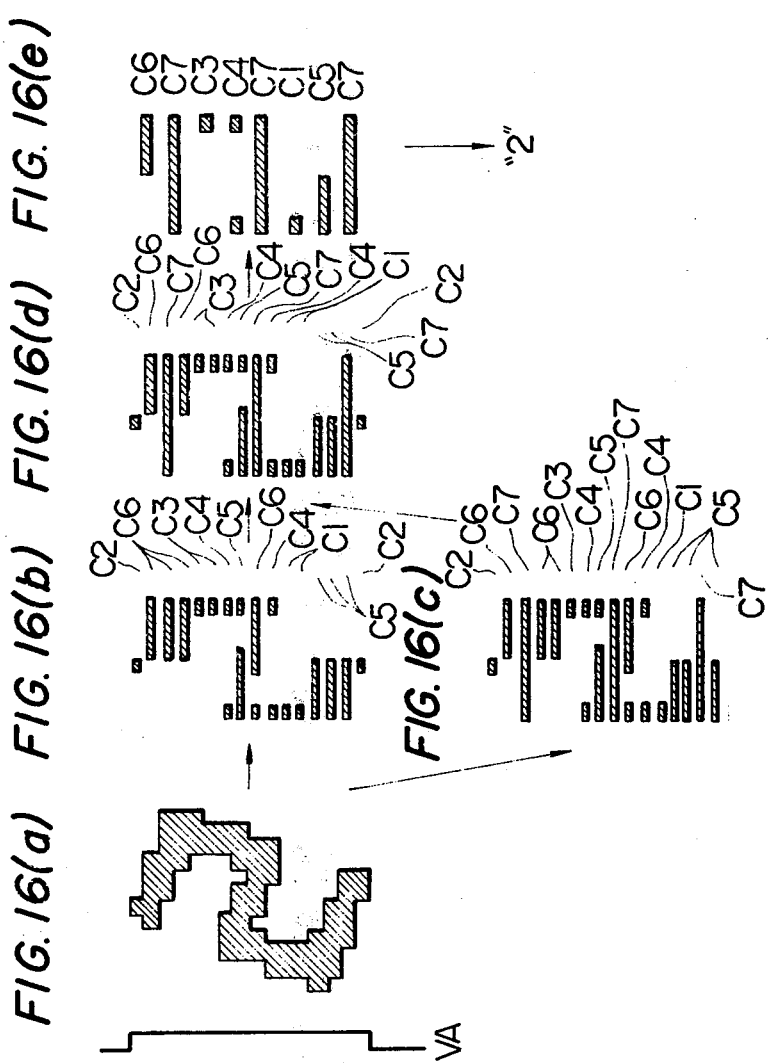

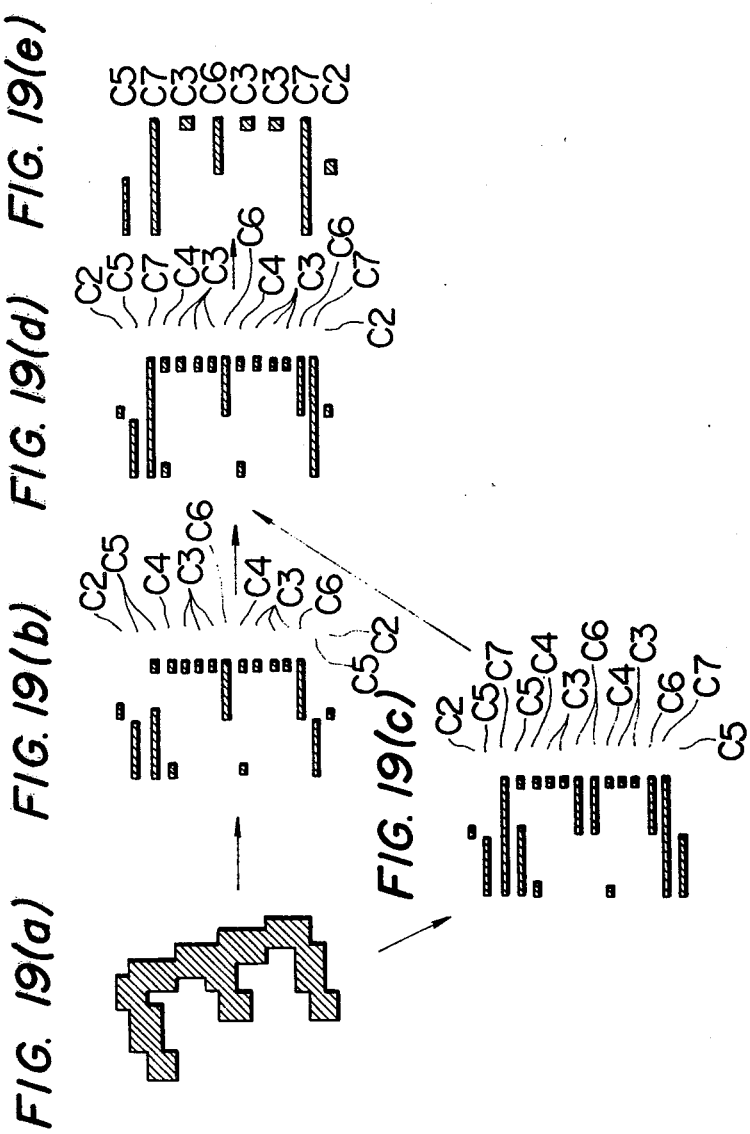

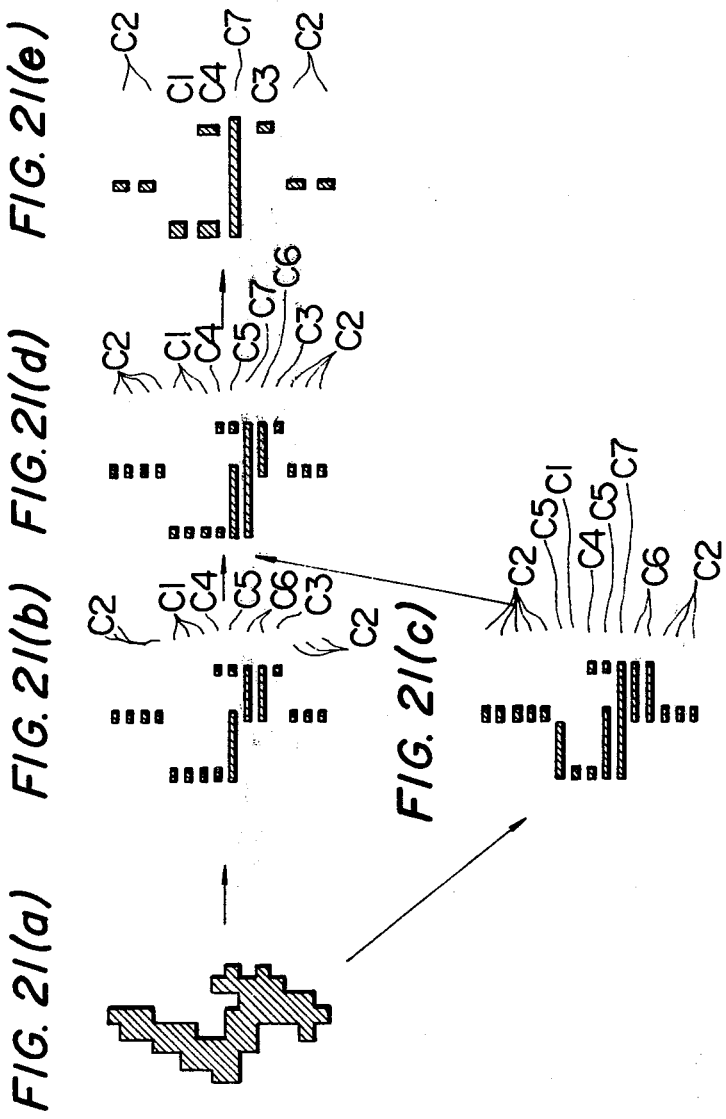

CHARACTER READING SYSTEM

BACKGROUND OF THE INVENTION

This invention relates to character reading system, and more particularly to a character reading system in which a character written on a sheet is manually scanned to optically read the character.

Most of the conventional devices for reading printed characters or written characters employ intricate scanning means utilizing flying spot scanning tubes or multistage registers. Accordingly, the conventional devices are unsatisfactory in that they are intricate in construction and high in manufacturing cost.

In such a conventional device, means such as a pattern matching means is employed. Therefore, if, when an original character pattern is converted into an electrical signal which is stored in a shift register or the like, it is inclined or is moved vertically or horizontally, it is difficult to recognize the character. Accordingly, it is necessary to carry out an intricate preprocess to allow the inclination and position of the character pattern to approach those of a standard pattern before the character recognition. Especially when the horizontal scanning rate is greatly varied, the scanner is not able to achieve the sampling timing synchronization and it is difficult to recognize the character. Thus, where the scanning is carried out manually, the reading of the character is impossible.

Some conventional devices employ histograms as recognition means. However, these devices are still disadvantageous in that characters to be read are limited.

An additional problem encountered in conventional character reading systems is the determination of the order of the detected characters when the direction of scan is varied.

FIG. 1 shows the case in which numerals 1, 2, 3, 4 and 5 on a sheet 31 are read by horizontally moving a sensor 32 along the sheet 31. In a conventional reading system, it cannot be detected whether the numerals are arranged in the order 1, 2, 3, 4 and 5 or in the order 5, 4, 3, 2 and 1. Therefore, in order to overcome this difficulty, the movement direction of the sensor 32 or the sheet 31 is limited to only one direction (of the arrow 33). Furthermore, in reading characters by moving the sensor 32 with the hand, the limitation of the movement direction to only one direction makes the operation rather troublesome or difficult. Therefore, it is necessary to put an English character before a series of numerals as shown in FIG. 2(a), or to place a start mark and an end mark respectively before and after the series of numerals as shown in FIG. 2(b). This is a further drawback accompanying the conventional character reading system.

SUMMARY OF THE INVENTION

Accordingly, an object of this invention is to eliminate the above-described difficulties accompanying the conventional character reading system. More specifically, an object of the invention is to provide a character reading system in which characters can be positively read even when the horizontal scanning rate is changed, the scanning direction is changed or the scanning is carried out at an angle with respect to a character to be read.

Briefly, these and other objects are achieved according to the present invention by first determining the character area by detecting the lines at which the uppermost and lowermost character segments occur and the columns at which the rightmost and left-most character segments occur. The lines and/or columns are then examined and classified according to the arrangement of character segments in each and, finally, the identity of the detected character is determined from the sequence of classification values. In order to simplify the recognition process, it is possible to examine the classification of only every other line or column in order to identify the character. Further, a line feature correction circuit analyzes the logical sum of the line features of adjacent lines to thereby correct errors which may occur due to oblique reading of the characters.

BRIEF DESCRIPTION OF THE DRAWINGS

This invention will now be described in detail with reference to the drawing, in which:

FIG. 1 is an explanatory diagram for a description of an ordinary scanning-reading system.

FIGS. 2(a) and 2(b) are diagrams for a description of a conventional scanning direction detecting method.

FIG. 3 is a block diagram showing one embodiment of this invention.

FIG. 4 is a diagram showing a picture frame having numeral "2".

FIG. 6 is an explanatory diagram indicating one example of the character segment feature classification.

FIGS. 7(a)–7(c) are diagrams for a description of the character segment feature extracting operation.

FIG. 11 is a block diagram showing a second embodiment of this invention.

FIG. 14 is an explanatory diagram concerning feature classification in the second embodiment.

FIGS. 16(a)–16(e) are diagrams indicating the relationships between a picture frame having an inclined character and a feature extracting operation.

FIGS. 19(a)–19(c) and FIGS. 21(a)–21(e) are diagrams for a description of the feature extracting operations for the picture frames shown in FIGS. 18 and 20, respectively.

DETAILED DESCRIPTION OF THE INVENTION

Figure 5:
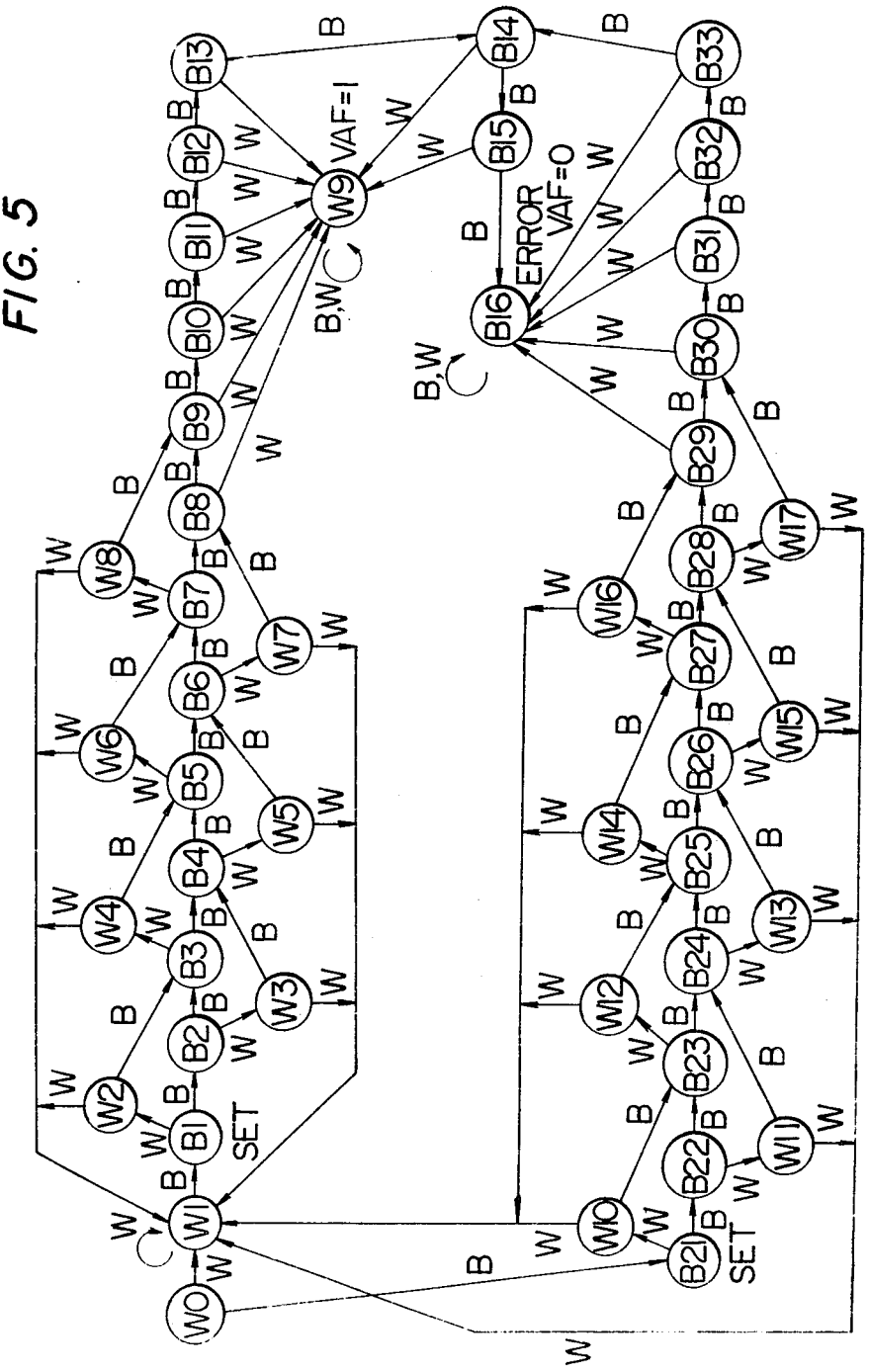
FIG. 5 is an explanatory state diagram for a description of the operation of a vertical quarrying-out circuit.

FIG. 3 is a block diagram showing one embodiment of this invention, in which indicated are a scanner 1, a hand 2, a sheet 3, a lamp 4, a lens system 5, a sensor 6, a control and binary circuit 7, a buffer register 8, a vertical quarring-out circuit 9, a line feature extracting circuit 10, a partial feature extracting circuit 11, a recognition process circuit 12, segregation flags 13 and 14, a direction flag 15 and a horizontal segregation and direction detection circuit 16. In this embodiment, characters are recognized by moving the scanner 1 held by the hand 2 in a horizontal direction along the sheet where the characters are recorded. The scanner 1 is provided with the lamp 4, the lens system 5, the sensor 6 and the control and binary circuit 7. The sheet 3 is irradiated by the lamp 4, so that the image of the character pattern is formed through the lens system 5 on the sensor 6 in which photosensitive elements are arranged in the form of a surface (two-dimensionally). The reflection light from the background region of the sheet 3 is different from that from the character region thereof, and the photosensitive elements receiving these different reflection lights provide different signals which are applied to the control and binary circuit 7, where they are subjected to level decision, as a result of which two states "white" and "black" are decided; that is, they are converted into digital signals. For instance, the signal corresponding to the background region or "white" of the sheet 3 is outputted as a "0" level signal, while the signal corresponding to the character region or "black" thereof is outputted as a "1" level signal.

The photosensitive elements of the sensor 6 will be referred to as "cells". A region in which data compression is effected to a resolving power required for recognition will be referred to as a unitary region.

FIG. 4 is an explanatory diagram showing one example of the relationships between the cells of the sensor 6 and the control and binary circuit 7 obtained when the image of a character pattern on the sheet 3 is formed on the sensor 6. A pattern formed by $B_n \times L_m$ cells will be referred to as a picture frame in the following description. The control and binary circuit 7 outputs signals for columns B1, B2, B3, ... Bn in the uppermost (first) line L1, then signals for columns B1, B2, B3, ... Bn in the next (second) line L2, ..., and finally signals for columns B1, B2, B3, ... Bn in the lowermost (last) line Lm. Thus, scanning one picture frame has been completed. The output signals for each line from the control and binary circuit 7 are stored in the buffer register 8. More specifically, the signals for the columns B1 through Bn in the first line L1 in FIG. 4 are stored in the buffer register 8, the signals for the columns B1 through Bn in the second line 12 are stored in the buffer register 8, and so on.

Then, quarring-out of the character area is carried out. The signals corresponding to the "white" and "black" data stored in the buffer register 8 are applied to the vertical quarring-out circuit 9 so as to detect a vertical character area. The number of successive lines containing "black" is determined, and when the number of lines thus determined corresponds to a predetermined character height, it is regarded as a vertical character area. FIG. 5 is a diagram for a description of the operation of the vertical quarring-out circuit 9. In the case where at least one of the cells at the columns B1 through Bn in one line is of the "black" or "1" level, "B" is indicated; while if all the cells in one line are of the "white" or "0" level, "W" is indicated. In other words, if it is assumed that the signals corresponding to the columns B1 through Bn in each line are represented by BW1, BW2, ..., BWn, and a "black" logical sum $BL_j = BW_1 + BW_2 + \ldots + BW_n$ (where $BL_j$ is the logical sum of a line Lj) is performed for each line, then if $BL_j = 1$, "B" is indicated; while when $BL_j = 0$, "W" is indicated. In FIG. 5, the initial state W0 in the quarrying-out circuit 9 is changed to the state W1 when W is applied to it in accordance with the input line, and the same state W1 is maintained with W in the following input line and the state B1 is obtained when "B" in the line Lj is inputted. Depending on the state obtained when the signals for up to the line Lm are inputted, it is determined whether the character area segregation has been successfully made or whether the signals are something other than characters, such as noises, and a signal corresponding to the determination is outputted. The state W9 means that a character area segregation has been successfully made, and a signal VAF="1" is outputted. The state B16 means a character area segregation error, that is, noise or the like, and in this case an ERROR signal is outputted and furthermore a signal VAF="0" is outputted. When the operation is completed with other states, no signal is outputted. When the state is changed to states B1 and B21, a signal SET is outputted, and by storing a certain line of the picture frame at that time the uppermost line VTAR of the character area is detected.

In the case of FIG. 4, the state is changed from the state W0 to the W1, and is changed to the state B1 by "B" of the line Lj. In this case, the signal SET is outputted, and the line Lj is stored as the uppermost line VTAR of the character area. If the signal SET is outputted more than once, the uppermost line VTAR is renewed whenever the signal SET is outputted, so that the line last set is employed as the uppermost line VTAR of the character area. Upon completion of scanning one picture frame, the same operation is repeated for the next picture frame. If, in this case, the signal VAF="1" has been outputted in the preceding picture frame scanning operation, the vertical segregation circuit 9 continuously outputs a vertical character area signal VA for the period of time corresponding to the number N of cells (the number of lines) corresponding to the character height counted from the uppermost line VTAR of the character (FIG. 4).

Now the horizontal segregation will be described. The number of lines corresponding to the signal VA outputted by the vertical segregation circuit is the vertical character area. On the other hand, with respect to the horizontal direction, detection is effected by the horizontal segregation and direction detection circuit 16 on the basis of the period of time corresponding to the number of lines (or the period of time during which the signal VA is outputted). If, when in the lines from Lj to L(j+N−1) in FIG. 4 all the first column B1 is of "white", at least one line in the second column B2 is of "black", and all N lines in the i-th column Bi are of "white", a condition $a < i < b$ (where a and b are constants determined by the relationships between a character to be read and the cells) is satisfied, and it is then determined that the horizontal character area has been detected. In other words, a "black" logical sum $BC_i = BW_{ij} + BW_{ij+1} + \ldots + BW_{ij+N-1}$ ($BC_i$ is the logical sum in the column i, and $BW_{ij}$ is the signal for the column Bi in the line Lj) in the vertical character area (from the line Lj to the line L(j+N−1)) is obtained for each of the columns B1 through Bn, and when $BC_1 = "0"$, $BC_2 = BC_3 = -- = BC_{i-1} = "1"$, $BC_i = "0"$ and the condition $a < i < b$ is satisfied, then it is determined that the character area segregation in the horizontal direction has been effected. As a result, the horizontal segregation and direction detection circuit 16 outputs a signal VHF="1".

The horizontal segregation and direction detection circuit 16 also outputs i of BCi="0" as to the endmost column BCL of the horizontal character area when the segregation has been effected. If the vertical segregation is not effected, that is, the signal VA is not outputted, or if the horizontal segregation does not meet the aforementioned condition, that is, the segregation is not successfully effected, a signal VHF="0" is outputted by the circuit 16. The segregation flag 13 operates to set the contents thereof in the segregation flag 14 and to store the contents of the signal VHF outputted by the horizontal segregation and direction detection circuit 16. When the contents of the segregation flag 13 is "1", and the contents of the segregation flag 14 is "0", the recognition process is completed.

A line feature extraction circuit 10 operates to extract the features of white/black data in one line of the character area and to classify them into several types with the aid of a clock signal CK1. FIG. 6 is a table indicating one example of the classification. In the picture frame shown in FIG. 4, the character area is formed by the lines Lj to L(j+N−1) in the vertical direction and the columns B1 to Bi in the horizontal direction. Therefore, the features of the columns B1 through Bi in the line Lj are extracted and classified, and then the features of the columns B1 through Bi in the line L(j+1) are extracted, . . . and the features of the columns B1 through Bi in the line L(j+N−1) are extracted and classified. FIG. 7(b) shows an example in which the features of the lines of the picture frame shown in FIG. 7(a) or FIG. 4 are extracted and are then classified in accordance with the method indicated in FIG. 6.

A partial feature extraction circuit 11 operates to combine the feature classifications Ci for plural lines, which are outputted by the line feature extraction circuit 10 for each of the lines, and to then classify them into several types (referred to as partial feature Di). This is to perform data compression in order to simplify the next recognition process and, therefore, it is not always required.

In the embodiment of this invention, classification is carried out for every two adjacent lines each having a feature classification Ci, and this constitutes the signal Di. In the case of carrying out the feature classification for every two lines, judging from the upper and lower positions of the two lines, the feature Ci of one of the two lines is selected to be employed as the partial feature Di. For instance, as shown in FIG. 7(c), the partial feature Di is extracted from the line feature Ci in FIG. 7(b) by selecting only the upper one of every pair of lines.

Figure 8:
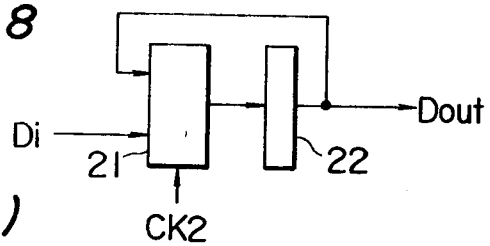
FIG. 8 is a block diagram showing the recognition process circuit.

A recognition process circuit 12 comprises a read only memory 21 and a memory device 22 as shown in FIG. 8. In this circuit, the partial feature Di is inputted with the timing of a signal CK2, and the content of an address indicated by both the feature Di and the contents of the memory device 22 is read out of the read only memory 21 to be stored in the memory device 22. The content of the memory device 22 obtained when the entire partial feature Di is inputted corresponds to the recognition result, and it is outputted as a recognition result output signal Dout.

Figure 9:
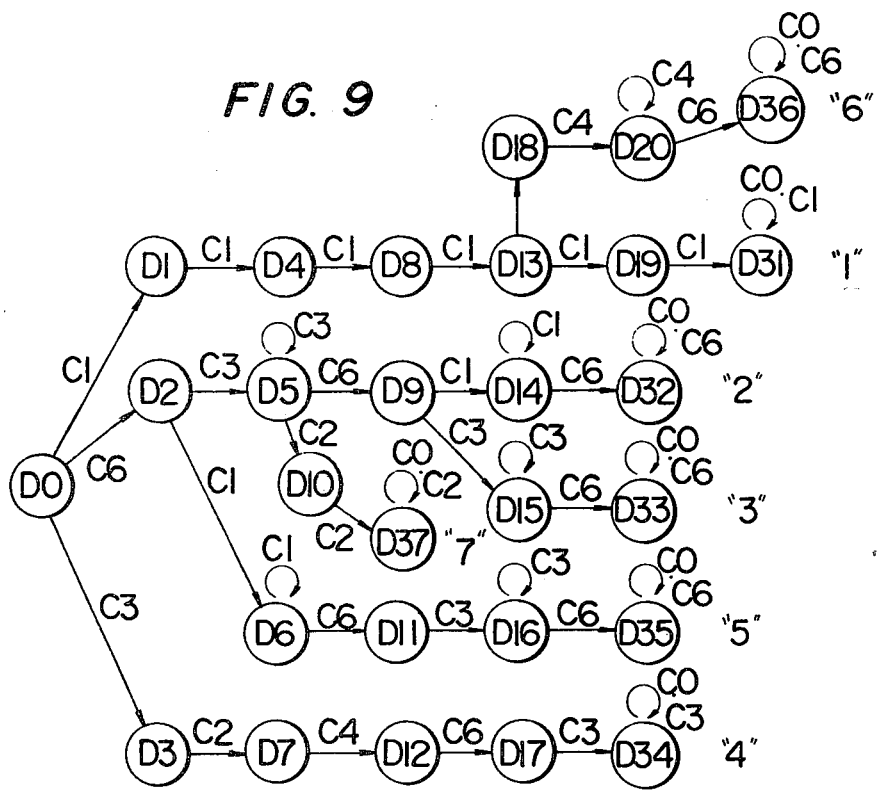
FIG. 9 is an explanatory state diagram showing a part of the state transition in a recognition process circuit.

FIG. 9 is a state diagram for a description of a part of the state transition of the recognition process circuit 12, in which reference character D0 designates the initial state, and reference characters D31 through D37 designate the recognition results of numerals "1" through "7", respectively. The state diagrams for the remaining digits would be obvious to one of ordinary skill in the art. In the case where, as shown in FIG. 7(c) the partial features C6, C3, C3, C6, C1, C1, C6 and C0 are extracted from the upper portion of the character, the state is changed in the order of D0, D2, D5, D5, D9, D14, D14 and D32. As the state D32 corresponds to numeral "2", "2" is outputted as the recognition result output signal Dout.

In the above-described embodiment, the buffer register 8 is employed; however, the provision of the buffer register 8 is not always necessary. In the case of other characters, e.g., letters, if the features of segments thereof are extracted, they can be recognized according to the occurrence order thereof.

In this invention, the character area is detected by the vertical segregation and the horizontal segregation so as to extract the feature of each line in the character area, and the character is recognized on the basis of the feature occurrence order. Even if the character on the sheet 3 is relatively obliquely scanned by the sensor 6, the inclination can be corrected with the feature occurrence order. Furthermore, even if the horizontal handling speed of the scanner 1 is changed, the recognition can be effected. In addition, even if the position of the character is moved vertically, the character area can be detected by the vertical segregation. Accordingly, the character can be recognized by horizontally moving the scanner 1 with the hand 2.

In the above-described embodiment, the horizontal segregation is effected after the vertical segregation; however, this segregation order may be reversed. The horizontal segregation conditions described above are that in the character area in the vertical direction all the first column B1 is of "white", and at least one line of the second column B2 is of "black"; however, all that is necessary is that the entire character is in one picture frame. Accordingly, the conditions may be that all the lines of the column B2 are of "white", and at least one portion of the column B3 includes "black".

Furthermore, in the above-described embodiment, the features of the lines are extracted by scanning the sheet in the horizontal direction of the two-dimensional sensor; however, the recognition may also be achieved by extracting the features by scanning the sheet in the vertical direction.

In addition, in the above-described embodiment, the resolution of the picture frame into unitary regions is effected by the photoelectrical conversion elements arranged in the form of a surface; however, it may be effected in combination with optical fibers. Furthermore, the scanning can be carried out with a flying spot scanning tube or a vidicon.

Figure 10A:
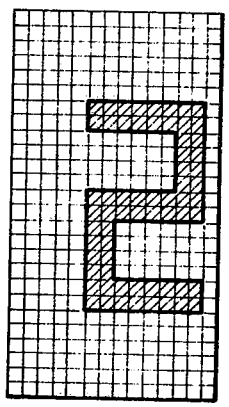
FIGS. 10(a)–10(c) are diagrams for a description of the scanning direction detecting operation.
Figure 10B:
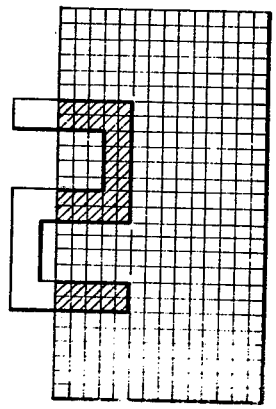
Figure 10C:
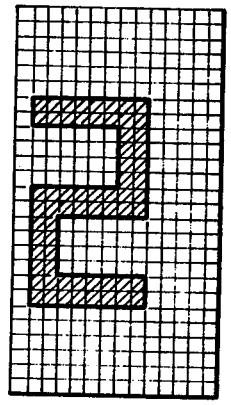

An additional feature of the present invention is that the horizontal segregation and direction detection circuit 16 may also detect the moving direction of the scanner 1. FIG. 10 is a diagram showing the relative movement of the sensor 6 and the character pattern. FIG. 10(c) indicates a state where the horizontal character area has been segregated. FIGS. 10(a) and 10(b) indicate states prior to the state shown in FIG. 10(c). When under the condition shown in FIG. 10(a), the sensor 6 is further moved in the direction of the arrow A and the state shown in FIG. 10(c) is obtained, whereupon the character area segregation is successfully effected and the character is recognized. Similarly as in the above-described case, when under the condition shown in FIG. 6(b) the sensor 6 is further moved in the direction of the arrow B and the state shown in FIG. 6(c) is obtained.

The horizontal segregation and direction detection circuit 16 operates to set the direction flag 15 to "1" when the cells in all the lines of the column B2 in the vertical character area are of "white", that is, the logical sum of the column B2 is "0" (BC2="0"). In contrast, when BC2="1", the circuit 16 operates to set the direction flag 15 to "0". Since the setting of the direction flag 15 to "1" or "0" is effected a short time after the completion of the recognition process, the direction flag 15 indicates the previous picture scanning state during the recognition process, and accordingly the direction flag indicates the state shown in FIGS. 10(a) or 10(b) when the recognition process is effected in the state shown in FIG. 10(c). Thus, the sensor 6 is moving from left to right (FIG. 10(a)) when the contents of the direction flag is "1"; while it is moving from right to left (FIG. 10(b)) when the contents of the direction flag is "0".

FIG. 11 is a block diagram showing a second embodiment of this invention, in which the vertical and horizontal character areas are determined as in FIG. 3 but the line feature extraction and identification is improved to correct errors which may be caused by oblique reading of the characters.

Figure 12:
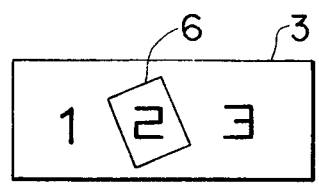
FIG. 12 is an explanatory diagram showing the case where a character is scanned obliquely.

Reading a character on the sheet 3 is carried out by moving the scanner 1 with the hand 2 as was described before. Sometimes the scanner is moved along the sheet 3 forming an angle with respect to the character on the sheet 3 as shown in FIG. 12, and in this case, it is impossible to extract the feature for every line. Accordingly, it is necessary to correct this inclination of the scanner 1.

Figure 13:
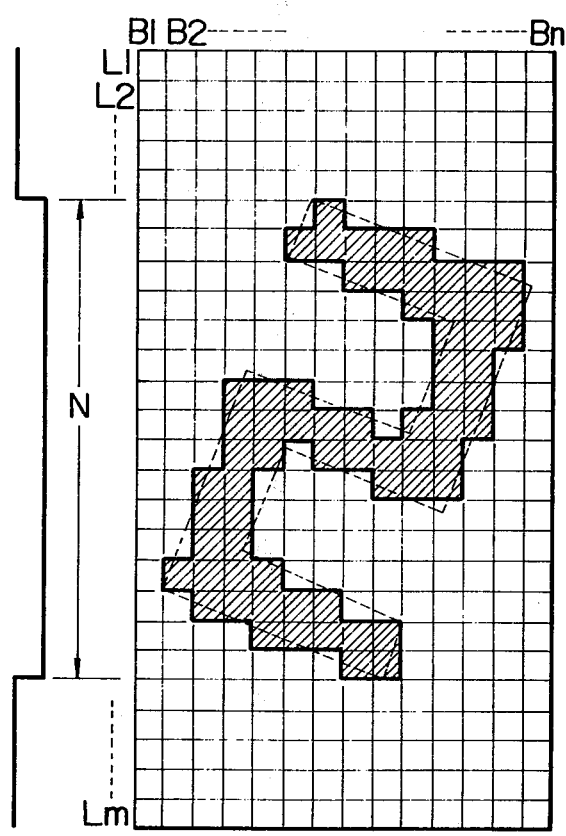
FIG. 13 is an explanatory diagram showing a picture frame in which a character is inclined.

If the scanning is effected obliquely with respect to the character, then the picture frame will be as indicated in FIG. 13. In extracting the features of a white and black pattern for every line, the features of the vertical segments of the character can be relatively satisfactorily extracted, but it is impossible to satisfactorily extract the features of the horizontal segments. Therefore, in this invention, correction with respect to the horizontal segments is carried out.

The signals for the columns B1 through Bn in the line L1 in FIG. 13, for instance, are stored in the buffer register 8, and in the next scanning the contents of the signals stored in the buffer register 8 are outputted, while the signals for the columns B1 through Bn in the line 12 are stored therein. The line feature correcting circuit 120 classifies the white and black obtained as a result of the logical sum in each line in accordance with the features as specified, for example, in FIG. 14, to thereby carry out the inclination correction; that is, the circuit 120 receives the signal which is a result of the logical sum of the output signal of the buffer register 8 and the output signal of the control and binary circuit 7 by the OR circuit 122, to thereby extract and classify the features.

FIG. 15 shows the classification of the picture frame of FIG. 4 according to the table of FIG. 14.

FIG. 16 shows the feature classification of the picture frame shown in FIG. 13. The classification is effected as shown in FIG. 16(b) by the line feature extracting circuit 100 from the picture frame shown in FIG. 16(a) similar to that in FIG. 13, and furthermore the classification is also effected as shown in FIG. 16(c) by the line correcting circuit 120.

The line feature selecting circuit 124 operates to select one of the output signal BSi of the line feature extracting circuit 100 and the output signal ASi of the line feature correcting circuit 120 to thereby output a line feature signal CSi. More specifically, the line feature selecting circuit 124 determines whether a relevant segment is a vertical segment or a horizontal segment for every line and, when it is a vertical segment, the output signal BSi of the line feature extracting circuit 100 is selected. On the other hand, when it is a horizontal segment, the output signal Asi of the line feature correcting circuit 120 is selected.

The determination as to whether it is a vertical segment or a horizontal segment is carried out as follows:

The line feature extracting circuit 100 extracts and classifies the features of white and black data of one line, and determines whether the features thus extracted include only the vertical segment or at least one part of the horizontal segment. When the horizontal segment is included in the features, the circuit 100 applies a signal "1" to the horizontal segment flag 111. On the other hand, when only the vertical segment is included in the features, the circuit 100 applies a signal "0" to the horizontal segment flag 111. The horizontal segment flag 111 operates to set the contents stored therein in the preceding line horizontal segment flag 112, and to store the output signal of the line feature extracting circuit 100.

In the case of the classifications C1 through C4 in FIG. 14, it is determined that the feature includes only the vertical segment, and the line feature extracting circuit 100 outputs the signal "0". In the case of the classifications C5 through C7, it is determined that the feature includes the horizontal segment, and the circuit 100 outputs the signal "1". In the case of the classification Co, the signal "0" is outputted by the circuit 100. In the line feature selecting circuit 124, only when both of the horizontal segment flag 111 and the preceding line horizontal segment flag 112 have signals "1", the output signal ASi of the line feature correcting circuit 120 is selected to provide the line feature signal CSi; however, in other cases, the output signal BSi is selected to provide the line features signal CSi.

FIGS. 16(b), 16(c) and 16(d) show the signal BSi, ASi, and the output signal CSi of the line feature selecting circuit 124, respectively.

In the partial feature extracting circuit 11, the feature classification signals CSi each outputted by the line feature selecting circuit 124 for every line are combined for plural lines and are classified into a plurality of kinds according to new features as in the embodiment of FIG. 3.

Figure 17:
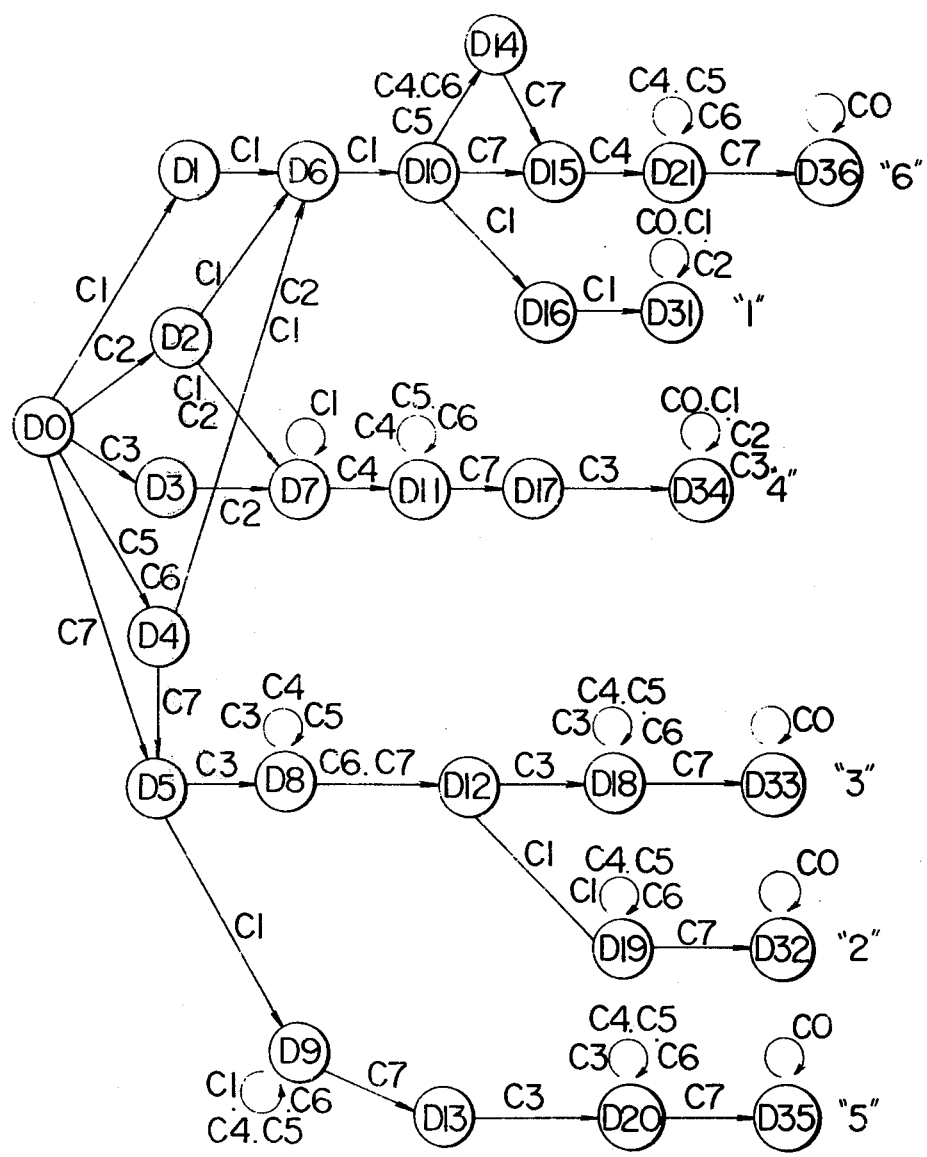
FIG. 17 is a diagram for a description of a part of the state transition in a recognition process circuit.

FIG. 17 is a diagram for a description of a part of the state transition of the recognition process circuit 12, in which reference character D0 designates the initial state, and reference characters D31 through D37 designate the recognition results of numerals "1" through "7", respectively.

Figures 15A, 15B, 15C:
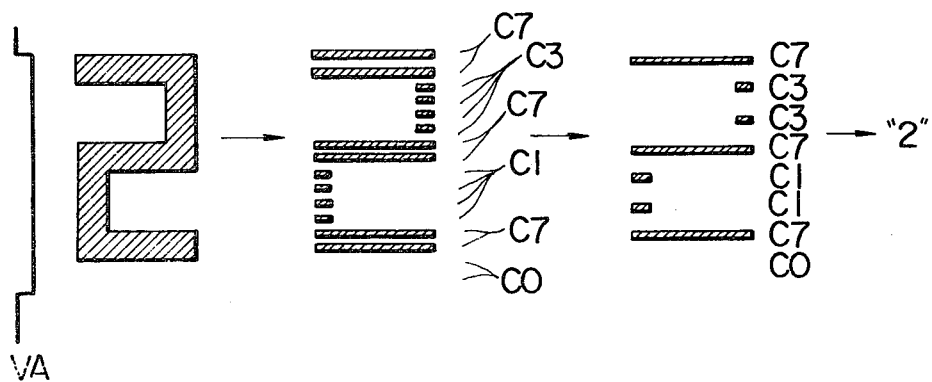
FIGS. 15(a)–15(c) are diagrams indicating the relationships between a normal picture frame and a feature extracting operation.

FIG. 17 is a state diagram which may be used in conjunction with the classification of FIG. 14 in order to identify the detected character. In the case where, as shown in FIG. 15(c), the partial features C7, C3, C3, C7, C1, C1, C7 and C0 are extracted from the upper portion of the character, the state is changed in the order of D0, D5, D8, D8, D12, D19, D19 and D32 in FIG. 17. Thus, in the state D32, numeral "2" can be recognized.

In the case where, as shown in FIG. 16(e), the features C6, C7, C3, C4, C7, C1, C5 and C7 are extracted from the upper portion of the character, the state is changed in the order of D4, D5, D8, D8, D12, D19, D19 and D32 in FIG. 17. Thus, in the state D32, numeral "2" can also be recognized.

Figure 18:
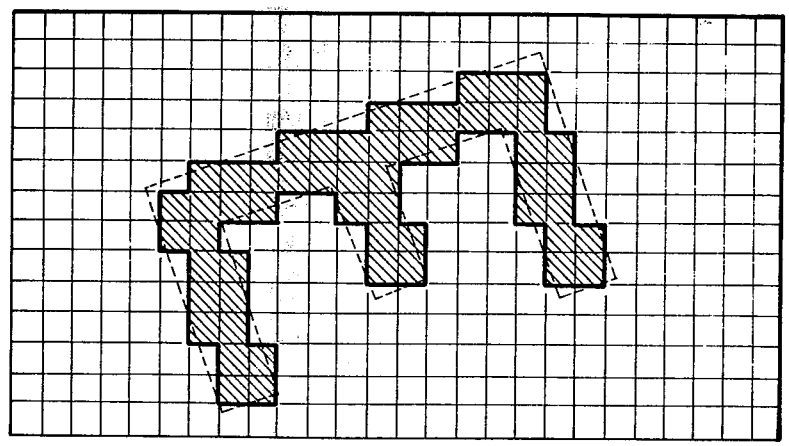

FIG. 18 shows a picture frame in which numeral "3" is inclined. FIGS. 19(a) through 19(d) show a process order corresponding to that in FIGS. 16(a) through 16(d). In other words, by inclination correction, the partial features are indicated by C5, C7, C3, C6, C3, C3, C7 and C2, and in FIG. 17 the state is changed in the order of D4, D5, D8, D12, D18, D18, and D33. Thus, in the state 33, numeral "3" can be recognized.

Figure 20:
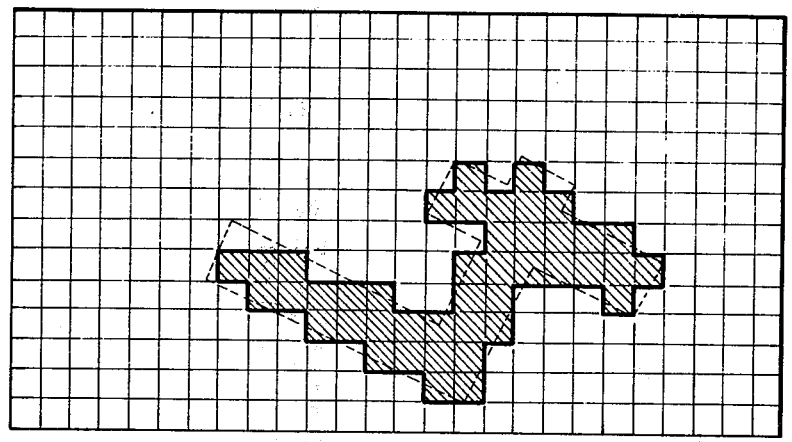
FIGS. 18 and 20 are diagrams showing picture frames in which numerals 3 and 4 are inclined, respectively.

FIG. 20 shows a picture frame in which numeral "4" is inclined. FIGS. 21(a) through 21(d) show a process order corresponding to that in FIGS. 16(a) through 16(d). In this case also, the partial features are indicated by C2, C2, C1, C4, C7, C3, C2 and C2, and the state is changed in the order of D2, D7, D7, D11, D17, D34, D34 and D34, as a result of which numeral "4" is recognized as shown in FIG. 17. Similarly as in the above-described cases, other numerals can be recognized by inclination correction.

As is apparent from the above description, in this invention, the vertical and horizontal segregations are carried out to detect the character area, the feature of each line in the character area is extracted, with respect to the horizontal segments the "black" logical sum of one line and the preceding line is obtained to correct the inclination of the character, and thereafter the feature of one line is extracted, so that the character is recognized by the combination of the features.

In extracting the feature for every line, correction of the vertical segment is carried out. Furthermore, it is possible to extract the feature for plural lines or plural columns. In the above-described embodiment, the resolution of the unitary region is effected by the photosensitive elements arranged in the form of a surface; however, it may be effected in combination with optical fibers. Furthermore, the scanning can also be carried out with a flying spot scanning tuber or a vidicon.

In the invention, the feature of every line is extracted, and a character scanned is recognized on the basis of the extracted feature occurrence order. Therefore, it is unnecessary to store the character pattern as an electrical signal, and accordingly it is unnecessary to provide a large scale memory device. In addition, even in the case where the character on the sheet 3 is obliquely scanned with the sensor 6, the inclination correction is carried out. Therefore, the character can be correctly recognized by moving the scanner 1 with the hand. This is one of the significant merits of the invention. Furthermore, with the character reading system of the invention, whenever one character is recognized, the moving direction of the sheet or the sensor is detected. Therefore, it is unnecessary to provide marks or symbols before and after a series of characters in order to read them. In addition, characters can be read even by moving the sheet or the sensor in both directions.

What is claimed is:

1. A method of reading characters of the type including the steps of scanning a character with a sensor having an array of photosensitive elements so that the illuminated or nonilluminated elements in said array correspond to segments of said character which collectively form an image of said character and processing the output signals from said elements to thereby identify the scanned character, wherein the improvement is characterized by said processing step comprising:

determining the character area of said array in which said image is formed;

analyzing the output signals from each row or column of the elements within said character area and assigning a true classification value to each row or column representative of the pattern of illuminated and non-illuminated elements therein;

analyzing the sequence of at least some of said true classification values in order to identify said character; and detecting the presence or absence of a character segment in a column of elements near one side of said character area to thereby determine the direction of movement of said scanner relative to said character.

2. A method of reading characters of the type including the steps of scanning a character with a sensor having an array of photosensitive elements so that the illuminated or non-illuminated elements in said array correspond to segments of said character which collectively form an image of said character and processing the output signals from said elements to thereby identify the scanned character, wherein the improvement is characterized by said processing step comprising:

determining the character area of said array in which said image is formed;

assigning logic values to the illuminated and non-illuminated elements in each row or column of the elements within said character area so that each row or column is represented by a first binary sequence in which a "1" corresponds to a character segment;

computing for each said row or column a second binary sequence comprising the logical sum of the first binary sequences of said row or column and the previous adjacent row or column;

assigning first and second classification values to said first and second binary sequences;

selecting one of said first and second classification values as said true classification value so that character identification errors caused by oblique scanning of said characters may be corrected; and analyzing the sequence of at least some of said true classification values in order to identify said character.

3. A method according to claims 1 or 2, wherein said determining step comprises the steps of determining as a vertical character area the number of consecutive rows in which a character segment occurs; and determining as a horizontal character area the number of consecutive columns within said vertical character area in which a character segment occurs.

4. A method according to claims 1 or 2, wherein said determining step comprises the steps of determining as a horizontal character area the number of consecutive columns in which a character segment occurs; and determining as a vertical character area the number of consecutive rows within said horizontal character area in which a character segment occurs.

5. A method according to claims 1 or 2, wherein the sequence of true classification values analyzed comprises every other one of said true classification values.

6. A method according to claim 2, wherein said improvement further comprises:

detecting the presence or absence of a character segment in a column of elements near one side of said character area to thereby determine the direction of movement of said scanner relative to said character.

7. A method according to claim 1, wherein said output signal analyzing and classification value assigning steps comprise:
assigning logic values to the illuminated and non-illuminated elements so that each row or column is represented by a first binary sequence in which a "1" corresponds to a character segment;
computing for each said row or column a second binary sequence comprising the logical sum of the first binary sequences of said row or column and the previous adjacent row or column;
assigning first and second classification values to said first and second binary sequences; and
selecting one of said first and second classification values as said true classification value, whereby character identification errors caused by oblique scanning of said characters may be corrected.

8. A character reading system of the type in which characters are scanned by a sensor having an array of photosensitive elements so that the illuminated or non-illuminated elements in said array correspond to segments of said character which collectively form an image of said character and the output signals from the elements are processed to thereby identify the scanned characters, wherein the improvement comprises:
means for determining the character area of said array in which said image occurs;
means for analyzing the output signals from each row or column of the elements within said character area and assigning a true classification value to each said row or column representative of the pattern of segments therein;
means for analyzing the sequence of at least some of said true classification values in order to identify said character; and
means for detecting the presence or absence of a segment in a column of elements near one side of said character area to thereby determine the direction of movement of said scanner relative to said character.

9. A character reading system of the type in which characters are scanned by a sensor having an array of photosensitive elements so that the illuminated or non-illuminated elements in said array correspond to segments of said character which collectively form an image of said character and the output signals from the elements are processed to thereby identify the scanned characters, wherein the improvement comprises:
means for determining the character area of said array in which said image occurs;
means for assigning a first classification value to each row or column of elements within said character area based on the pattern of segments occurring therein;
means for logically summing the pattern from each row or column with the pattern from the previous row or column;
means for assigning a second classification value to said row or column based on the pattern of segments in said combined pattern;
means for selecting one of said first and second classification values as said true classification value; and
means for analyzing the sequence of at least some of said true classification values in order to identify said character.

10. A system as claimed in claims 8 or 9 wherein the sequence of true values analyzed comprises every other one of said true classification values.

11. A system as claimed in claim 9, further comprising means for detecting the presence or absence of a segment in a column of elements near one side of said character area to thereby determine the direction of movement of said scanner relative to said character.

12. A system as claimed in claim 8, wherein said means for analyzing said output signals and assigning said true classification values comprises:
means for assigning a first classification value to each row or column based on the pattern of segments occurring therein;
means for logically summing the pattern from each row or column with the pattern from the previous row or column;
means for assigning a second classification value to said row or column based on the pattern of segments in said combined patterns; and
means for selecting one of said first and second classification values as said true classification value.

* * * * *